(12) United States Patent
Ndoutoumou

(10) Patent No.: US 11,373,237 B2
(45) Date of Patent: Jun. 28, 2022

(54) INVESTMENT SYSTEM INTERFACE WITH DEDICATED BUFFERS

(71) Applicant: Numeraxial LLC, Flushing, NY (US)

(72) Inventor: Jean Ndoutoumou, Flushing, NY (US)

(73) Assignee: NUMERAXIAL LLC, New York, NY (US)

( * ) Notice: Subject to any disclaimer, the term of this patent is extended or adjusted under 35 U.S.C. 154(b) by 285 days.

(21) Appl. No.: 16/823,839

(22) Filed: Mar. 19, 2020

(65) Prior Publication Data

US 2020/0302529 A1    Sep. 24, 2020

Related U.S. Application Data

(60) Provisional application No. 62/822,526, filed on Mar. 22, 2019.

(51) Int. Cl.
*G06Q 40/00*    (2012.01)
*G06Q 40/04*    (2012.01)
*G06F 12/0802*  (2016.01)

(52) U.S. Cl.
CPC ......... *G06Q 40/04* (2013.01); *G06F 12/0802* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 2012/0300616 A1* | 11/2012 | Zeng | ................ | H04W 72/1289 370/216 |
| 2020/0019346 A1* | 1/2020 | Wu | ..................... | G06F 12/0646 |
| 2020/0151088 A1* | 5/2020 | Gu | ........................ | G06F 30/343 |

FOREIGN PATENT DOCUMENTS

EP    1118188 A1 *  7/2001   ....... H04L 12/40058

* cited by examiner

*Primary Examiner* — Olabode Akintola
(74) *Attorney, Agent, or Firm* — Hogan Lovells US LLP

(57) ABSTRACT

Systems and methods are disclosed to enable a system to address latency and accuracy issues in financial trading. A system with multiple buffers and at least two processors are provided to load data associated with values for securities, a plurality of executable code associated with a plurality of predetermined functions to process the values of the data; and parameter data and datasets associated with output of the individual executable code. The parameter data provides scheduling and mapping for the at least two processors in the computing system to process the values. Datasets are generated for the third buffer area after the processing of the values and results from the datasets are projected in a multi-dimensional event space of a user interface using the datasets with a predetermined granularity so that risk values are provided dynamically with security values from the results.

20 Claims, 8 Drawing Sheets

INVESTMENT SYSTEM INTERFACE WITH DEDICATED BUFFERS

CROSS REFERENCE TO RELATED APPLICATIONS

This application claims the benefit of priority from U.S. Provisional Patent Application No. 62/822,526, filed Mar. 22, 2019, entitled "INVESTMENT SYSTEM INTERFACE WITH DEDICATED BUFFERS," the entirety of which is incorporated by reference herein for all intents and purposes.

BACKGROUND

Databases and interfaces for trading rely on remote servers and computing devices to crunch valuations as changes occur in commodities. While the databases and the interfaces provide some form of communication between various markets and client devices, this may not be efficient for high frequency trading. In particular, high frequency trading suffers from latency and difficulty of use due, in part, to the complexity and the speed at which transactions occur. It may frequently be the case that the interface and database do not synchronize fast enough to actually execute a trade that was ordered several minutes or seconds ago. The failure to update the interface in a timely manner to match the frequency at which trades occur causes large turnover issues with respect to executed trades occurring past the intended period.

BRIEF DESCRIPTION OF THE DRAWINGS

Various embodiments in accordance with the present disclosure will be described with reference to the drawings, in which.

DETAILED DESCRIPTION

Figure 1:
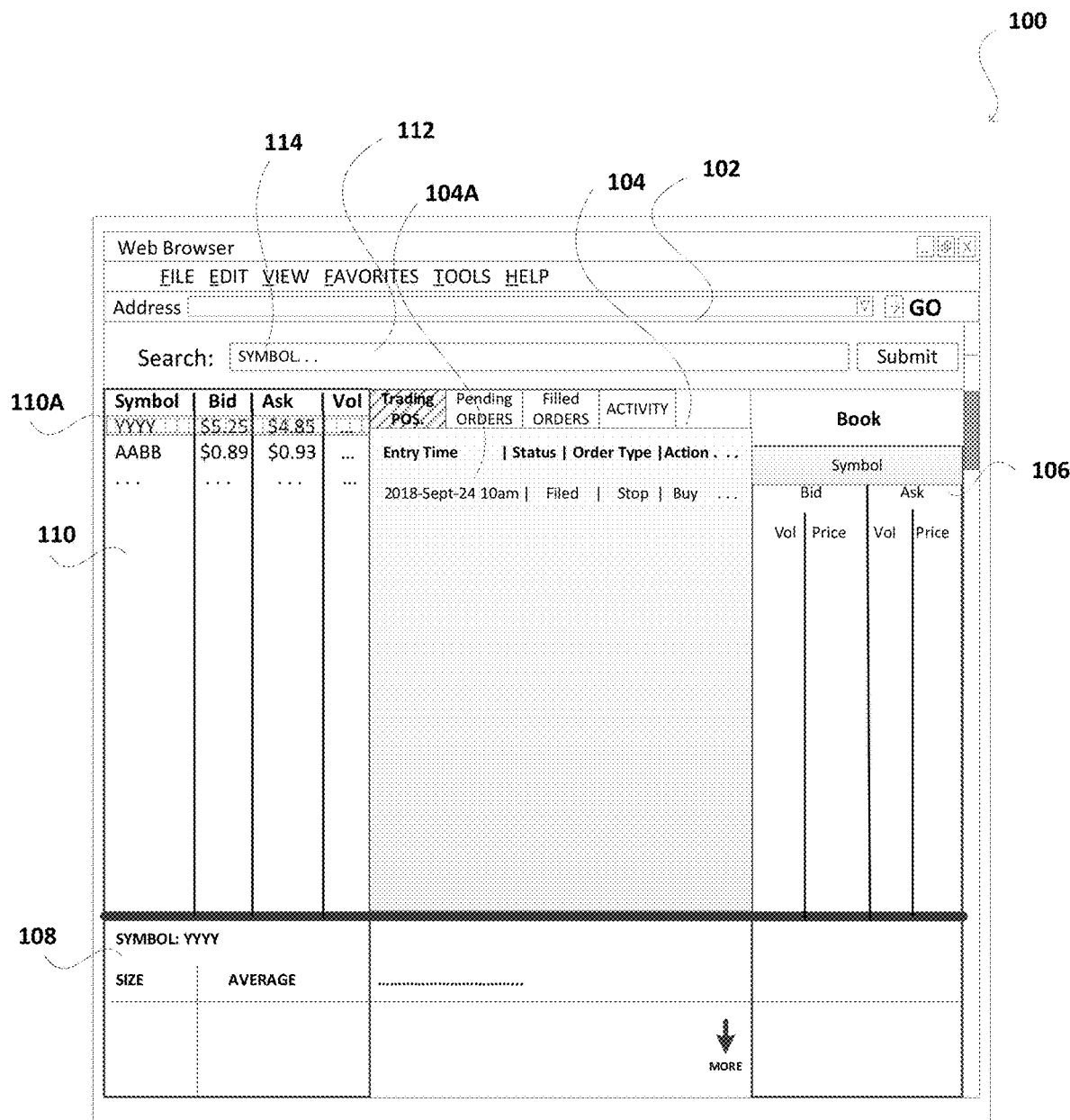
FIG. 1 illustrates an example of a window of display content presented with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to access data displayed on a user interface of an investment trading system. For example, using multiple dedicated buffers on a computing system, such as one or more servers, to store specific data associated with values of securities, to load specific predetermined functions—e.g., using executable code, and to schedule and map the data with the predetermined functions and at least two processors of the computing system enables faster access and processing of the data. Further, using the computing system and one or more portions of the data to perform portions of specific computations for a portfolio analysis enhances a computing system's response time and also manages available memory in an efficient manner. The system of the present disclosure is also able to display changes in risk—projected for present values, for example, to anticipate future changes and to dynamically display these changes in a multi-dimensional event space. In an aspect, profit or loss basis projected for a security is displayed with associated risk—in a dynamic manner. For example, the current value along with a projected value and the associated risk may be provided in a location corresponding to the value and time. Selection of the current value triggers purchase at the value at a present time or a future time. Such a process enables faster and accurate reaction to rapid changes in security pricing than a conventional system.

Moreover, the present system is also able to precompute information as part of the data, such that the data in the first buffer is fresh. In an aspect, a threshold time is set for the data in the buffer and the data may be overwritten with current or precomputed information as the current or precomputed information becomes available. The use of the precomputed information, along with the executable code of other buffers, provides faster updates to the multi-dimensional event space a trading system. In an example, the portions of the specific computations may be phases for a portfolio analysis.

In an aspect, a system of the present disclosure uses a dedicated buffer subsystem to reduce memory access time to data and to executable code defining predetermined functions used to process data associated with securities. For example, the dedicated buffer subsystem allows for parallelized computing using at least two processors to reduce latency and to enhance performance of a financial system, such as used for financial trading. A process using the buffer subsystem may then phase financial computing by partitioning the workload of the trading system by asset classes in the data of first buffer. This provides bundles of asset classes as sub-portfolios in the first buffer, and allows for loading of specific executable code associated with predetermined functions to process the bundles of asset classes to generate output stored in a third buffer. Furthermore, parameter data provides scheduling and mapping of the at least two processors to perform the predetermined functions by executing associated executable code using each bundle of asset class, and to finally combine potions of output from each of the at least two processors to provide a dataset. The dataset is used to generate results for display in a multi-dimensional event space. In the above-referenced phases, occurring at the same or a later time, sorting and computations to the bundles of asset classes are enabled via the executable code stored on the second buffer.

The datasets, in an example, may be raw processed values from security values—may reflect risk values, projected values, profit and loss basis from the present value to the projected values using different risk assessments either in a single predetermined function or from multiple predetermined functions (each of the risk assessments or the multiple predetermined functions processed by a scheduled and mapped processor). The output may be organized and channeled via a third buffer for use by the computing system in a display area. As such, the buffer subsystem is capable of storing two categories of files—files including the executable code and files for the data and/or for the parameters. The bundles of asset classes include the values stored in the first buffer and they may be constantly (and dynamically) updated based in part on fetched market data.

Further, the precomputed assets and valued instruments or securities are processed in parallel by the computing system using a multi-communication channel feeding an analytics engines. Furthermore, such an analytics engine is able to perform any number of processing requirements—including without limitation, a single factor stochastic differential equation (SDE), an Explicit Euler function, a Milstein function, a semi-implicit Euler function, an Implicit Milstein function, a weak predictor-corrector function, a transform semi-implicit Euler function, and a transform explicit Euler function. Further, results are generated from the datasets for display in a multi-dimensional event space of a user interface with a predetermined granularity so that risk values are provided dynamically with option or security values from the datasets. The option or security values relate to, in one instance, present and projected bid or ask values, along with associated risks, for a security. The granularity reflects time or frequency at which updates to the values occur. The parameters that include the scheduling and mapping may also be used to determine the frequency with which to update the processed values, for instance, thereby contributing or being associated with the granularity. At high frequency trades, the granularity is typically in the range of days, hours, minutes, and even seconds. The projected values of a security may be provided with different risks, with the current value, and projected through predetermined intervals of time.

FIG. 1 illustrates an example 100 of a window 102 of display content 106-110 presented with various embodiments. In the example 100, the window 102 represents a user interface of a static manner, whereby information associated with symbols YYYY, AABB, etc. 110A are provided in columns 110 with bid, ask, and volume values. The window 102 is static because, even though the bid, ask, and volume values change, they change in a manner of a ticker, for example. As such, executing a trade, via an order in section 108 merely reports the values in the same areas as in the columns 110. With the values in the columns 110, book values are provided as additional and separate tickers in area or section 106. A user of the window 102 may additionally select certain symbols for display via an entry 114 in field 112. In an example, multiple entries may be provided separated by a separator symbol such as a comma or a semi-colon, etc. When provided in the field 112, the symbols and associated bid and ask values are fetched and may be provided in section 110. Selection 110A of a symbol in section 110 results in information 104A, for that symbol, displayed in section 104. In an example, such information 104A may include prior activity for that symbol by the user of the window 102 or the system, in general.

Figure 2:
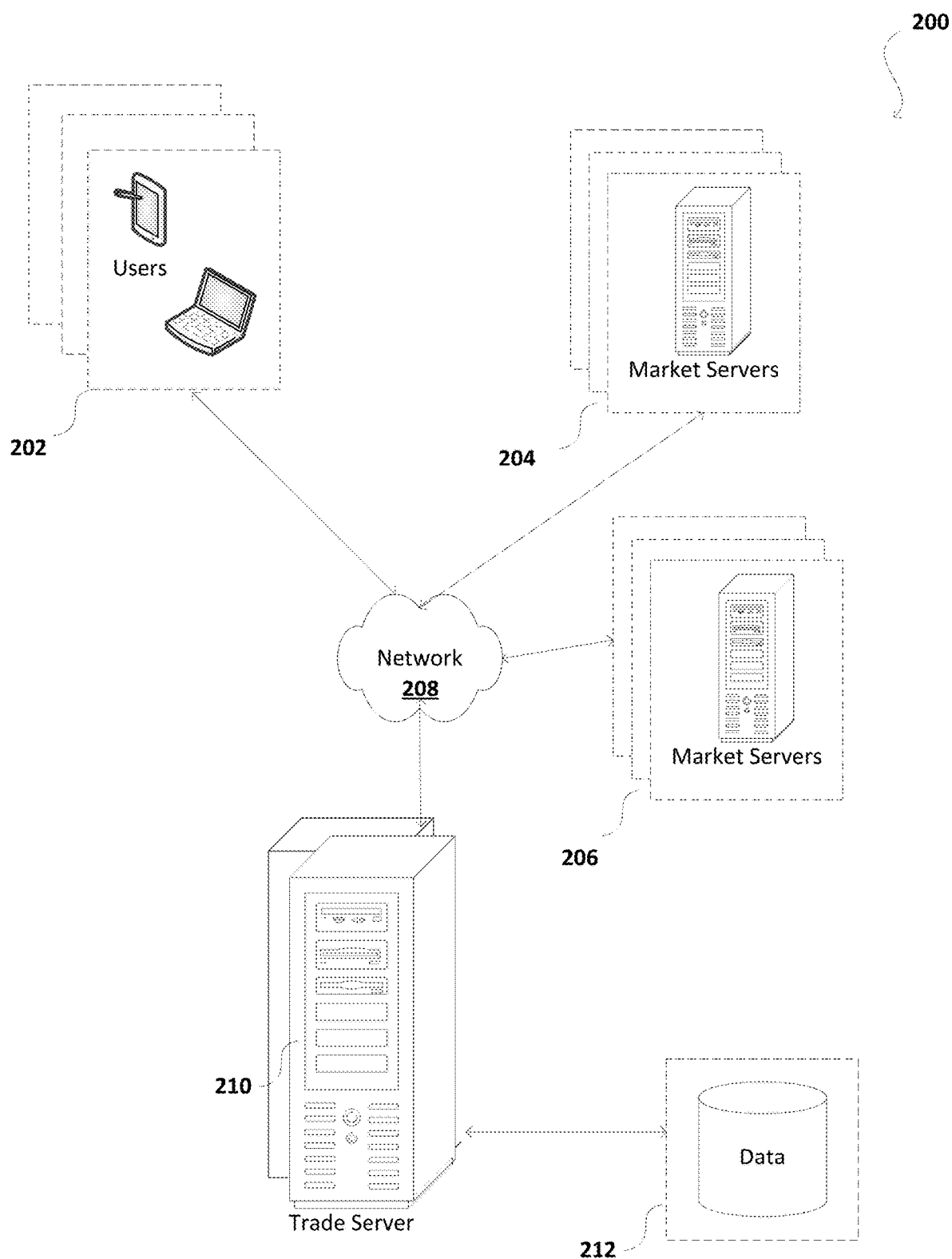
FIG. 2 illustrates an example system architecture for supporting a trading or investment system.

FIG. 2 illustrates an example architecture for a computing system 200 that supports a trading, investment, or other applicable financial transaction system. Client computing devices or client devices 202 receive and display a user interface for communicating with one or more trade servers 210 via a network, such as an internet, 210. The one or more trade servers 210 receive raw values from one or more market servers 204, 206, and use the raw values to compute display values for each and every relevant symbol to be displayed to the user interface. Separately, the raw values and computed display values may be logged in database 212 for historical analysis and displaying trends to the user interface. In the static implementation previously described, the database 212 is of a fixed structure with raw values stored in specific areas, and with computed display values provided to the client device to update ticker displays of section 106, in FIG. 1, or example.

Figure 3A:
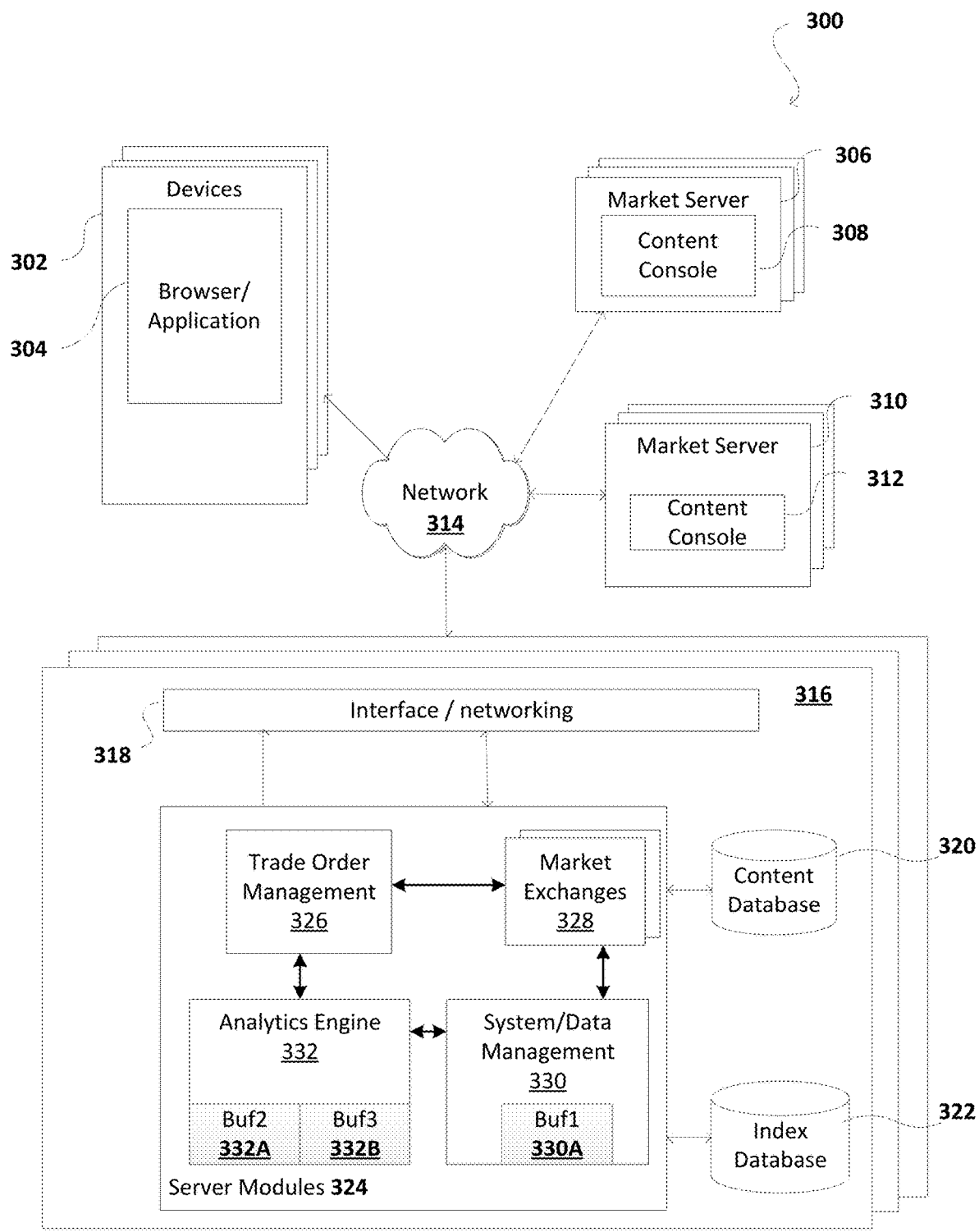
FIG. 3A illustrates example system architecture for performing the disclosed embodiments in accordance with another aspect of this disclosure.

FIG. 3A illustrates example system architecture 300 for performing the disclosed embodiments in accordance with another aspect of this disclosure. The example system architecture 300 is a representation of a computing system that, for example, may be spread across multiple components, devices, servers, in a coordinated manner. The number of components, devices, and servers may be two or more of any combination of each, and may include at least two processors and multiple associated buffers functioning as dedicated buffers for data and/or for executable code. In FIG. 3A, an implementation of the present disclosure is capable of allocating buffer areas or entire buffers 332A, B, 330A for performing distinct roles or phases of financial processing in devices 316. Reference numerals 332A, B, 330A are provided as full blocks, but a person of ordinary skill reading the present disclosure will understand that these may be buffer areas in components or devices 332, 330, and may virtually exists across physical boundaries of one or more buffers. Device 316 is one or more servers with processors and memory components, and may include dedicated special purpose or coded-general purpose processors to perform the analytics discussed herein. Further, devices 302 may be client devices or an intermediate device to the client devices. For example, when devices 302 are intermediate devices, they could function as an intermediate or fetch server that addresses latency by fetching information popularity requested by client devices.

In an example, the roles or phases may be to store specific executable code and/or to store data for parameters and values of securities, along with datasets once the values are processed using predetermined functions defined in the executable code. In an example, the executable code is prefetched or loaded to the buffer area 332A of analytics engine 332 after being received from a system/data management module 330. Analytics engine 332 may include two or more processors including one or more types from a central processing unit (CPU), a graphical processing unit (GPU), and a field-programmable gate array (FPGA). As such, the buffer areas 332A, B, 330A are illustrated as blocks within the analytics engine 332 or the system/data management module 330, but a person of ordinary skill reading this disclosure will understand that the buffer areas 332A, B, 330A may simply be physically or virtually separate buffers outside the components making up the analytics engine 332 or the system/data management module 330. Further, while the buffers are marked Buf1 330A, Buf2 332A, and Buf3 332B, this reference is for purposes of simplicity—so more than three buffers, either physically or virtually, and overlapping buffer areas may be dedicated to the present features.

In a further example, the data may include precomputed values stored as part of the datasets for further processing.

For example, the data may include filtered portions and transformations (e.g., to a common scale—i.e., currency-based or time-based). The executable code may then rely on these precomputed values to support processing of values in the data to provide and output of datasets, from which results are provided to a user interface that is dynamic. The user interface is dynamic in terms of displaying, in a multi-dimensional event space, current option or security value and risk values, together with projected values for each current value and associated risk values, for instance. A buffer controller may be integrated with the buffers, may be a separate component, or may be integrated with a processor of the device or component hosting the buffers. In an example, the buffer controller is scheduled to bring one or more of the buffers 332A, B into action for loading executable code by first executing code from the parameter data or files of Buf3 332B. In such an aspect, the buffer controller is part of or integrated with the analytics engine 332. The analytics engine 332 may include one or more processors, which may communicate with the buf2 332A and with Buf3 322B. When the buffer controller activates the one or more buffers 332A, B, executable code of the active buffer is provided to the processor to process using input from the parameter data of the active buffer. In an example, the processor is a Field Programmable Gate Arrays (FPGA) built to support the analytics engine for real-time risk assessment. In such an implementation, buffer areas 332A, B are provided with executable code for risk assessment frameworks described throughout, such as a Monte Carlo framework.

Further, FIG. 3A illustrates components of a trade server(s) 316. Trade server 316 may be addressed in the plural sense—trade servers—even if multiple servers perform phased tasks towards a unified goal. As such, a person of ordinary skill would recognize that the present disclosure supports multiple trade servers hosted by a single entity or by multiple entities—all providing data and processing of the data to a unified goal of an improved financial system that reduces latency in dynamic information processing and display. In an aspect, trade server 316 includes server modules 324. The server modules 324 include trade order management module 326, market exchanges module 328, and a system/data management module 330. The modules may be in one or more servers forming the trade server 316. Aspects of the one or more servers are provided in the example of FIG. 3B.

In an aspect, the market exchanges module 328 communicates with market servers 306 via their respective content console 308, 312, to secure real-time data for the parameter files of the devices 302. The communication may be via application programming interface (API) calls to the content console 308, 312. As such, the present disclosure, using the above referenced modules is able to support financial/investment activities, such as trading and, particularly, high frequency trading (HFT) using real-time information that is partly precomputed at the trade server 316 and provided to client or intermediate devices 302. This architecture is well suited for multi-asset class portfolio of large size, including stocks, bonds, stock options, Bermudian options, swaps, swaptions, etc. Content database 320 enables long term storage of values as they are provided from market servers 306, via the market exchange module 328. Index database 322 may store precomputed values for the devices 302. Index database 322 is of an architecture that allows faster access as the data may be indexed by a time and symbol identifier in a limited width table, for instance.

The present method and system enables instantaneous risk measurements, reflecting risk changes in real time projected from current values, as they change, for various securities. Trade execution, especially applicable for HFT when trading on electronic exchange and web-based application trading, is also supported by the APIs in the market exchanges module 328, for instance. In addition, the present method and system improves the user trading experience and significantly enhances portfolio returns because of an ability to reduce latency and to improve accuracy in triggering trades. For example, by precomputing the necessary information and loading these to a first buffer for execution with executable code from a second buffer, the buffers always include the appropriate information and executable code to respond to market changes. The method and system additionally provide visualization that is distinct from conventional systems by virtue of a dynamic graphical user interface (GUI) that displays an instrument's values projected from changing current values, along with associated changes in risk positions in a dynamic manner. This is a simultaneous display of the price of the instrument, its trading value, and an associated risk. The displayed information is also inclusive of a user selectable option that allows for accurate selection of the displayed instrument value for which an order is to be executed.

The future risk of positions and of aggregated portfolio, may be made accessible in second, minutes and hours as discussed with reference to the illustration in FIG. 4. The data analytics engine or module 336 may store the executable code loaded to one or more buffers bufA 332A, bufB 332B. The trade order management engine or module 326 handles the trade orders from the client device and executes them via the market exchanges 328. A risk engine may form part of the system management 330 to precompute risk parameters that are then provided to the devices 302. The market servers 306, 310 may be multiple sources of values for current securities. At predetermined time frames, market feed data is obtained from the servers 306, 310. The servers may be recognized resources like Bloomberg®, Morningstar®, Intrinio®, and Google Finance® and other databases.

The market feed data for options, futures, currency trades, etc. can be retrieved in several ways, including by use of the previously-referenced API to query and retrieve current portfolio positions from the servers 306, 310. The system management engine or module 330 is configured to normalize the market feed data, both in real time and by batches. The normalized data may be sent to the analytics engine 336 for computation of the precompute values, for instance. More detail is provided via the implementation of FIG. 3B, for instance. In an aspect, the analytics engine 336 returns various risk information for use in the GUI along with current and projected values. From the analytics engine 332, datasets forming outputs of various projections are stored in Buf3 332B, and from which graphical 2D and 3D charts are generated for presentation in the GUI. The GUI displays risk information, calculated in the outputs, dynamically on the device 302. The risk may be, therefore, provided using a higher resolution in a tail of a loss distribution curve. The higher resolution is obtained by the greater granularity of the tail distribution. With the use of APIs, the market feed data is automatic retrieved and real time economic events that affect the market feed data that are instantaneously utilized to determine changes to risk values and to forecast new risk for a current position. When a current value or a projected value that is displayed in the GUI is selected on the client side, a trade may be initiated at that current value or projected value. As risk values are displayed for the current value and the projected value, the user is fully informed to trigger a trade accurately—either currently or at a future time using the projected value.

The present method and system allows for reduction in the batch processing and real time processing time which typically contributes to the overhead for latency. In addition, cross-platform scalability is obtained by the above-referenced normalizing of feed data. The sharing of the workload between sever components, for precomputing, and the device 302 simplifies the modules in the server. There is also a reduction in data redundancy by allowing computed and precomputed data to be indexed, by storing raw data separately, and by loading portions of the data to the buffer required for projecting values and associated risk based in part on user preference for certain securities. The system architecture 300 illustrates a layered structure with operations being performed by parallel functional units of the modules 326, 330, and 336. The buffers 332A, B, 330A are also accessible in parallel. Operations may be performed without special instructions in most cases because the executable code is available in the buffer for subsequent processing prior to the display. For example, loading data from a first buffer and associated executable code from the second buffer causes the data to be processed by the executable code to generate datasets stored into a third buffer. Dependency of data flow are resolved statistically at compile time in the present system and method. For example, the executable code is loaded to the processor in a scheduled manner and mapped to certain processor(s) for processing, as indicated by respective parameters stored in the third buffer. The data may include precomputed values for processing. The executable code may be complied at the servers, once mapped to associated processors, and option values and risk values are displayed in a selectable manner from the datasets generated as a result of the processing. As such, the entire data flow is pipelined from the modules and occurs with much reduced latency due to the computation that occurs in parallel from the three buffer areas, for instance.

Figure 3B:
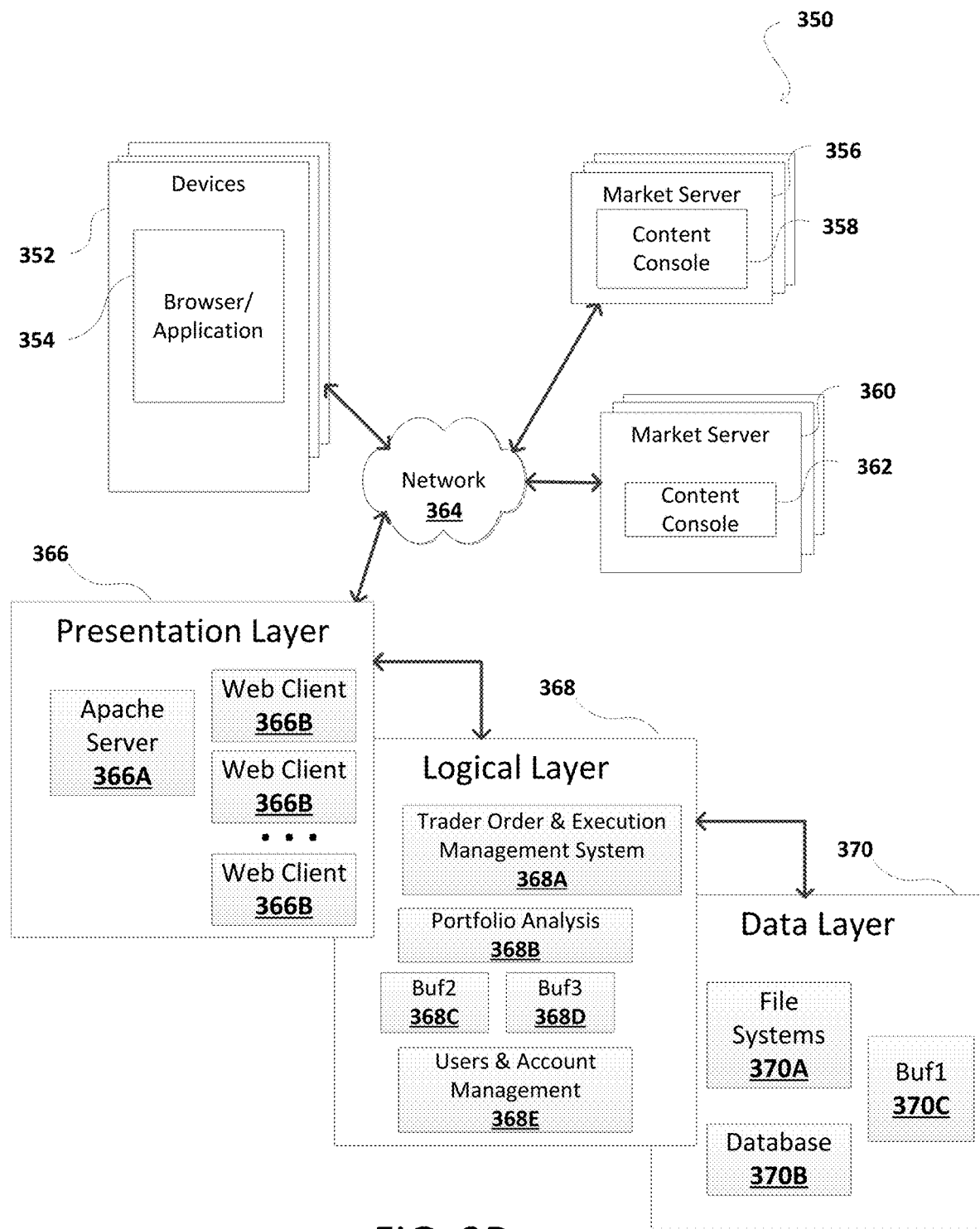
FIG. 3B illustrates a further example system architecture for performing the disclosed embodiments in accordance with aspects of this disclosure.

FIG. 3B illustrates a further example system architecture 350 for performing the disclosed embodiments in accordance with aspects of this disclosure. Aspects of FIG. 3B may be similarly performed from the discussion with respect to FIG. 3A. Particularly, reference numerals 352-364 perform similar functions to components 302-314, and the discussion of these components from FIG. 3A applies to FIG. 3B. FIG. 3B, however, provides a particular combination of servers to perform functions under the multiple components, devices, and servers reference provided for reference numeral 316 in the embodiment of FIG. 3A. In FIG. 3B, an Apache server 336A provides a presentation layer 336, with multiple web clients 336B; a logical layer 338 is enabled by one or more servers providing a Trade Order & Execution Management System 368A, a Portfolio Analysis system 368B, Buffers 368C, D, and Users and Account Management system 368E; and a data layer 370 is enabled by one or more servers providing structure for File Systems 370A, Database 370B, and associated Buffer 370C. As in the case of FIG. 3A, the Data Layer 370 may perform substantial features of blocks 330, 320, and 322 of the computing system 300, the Logical Layer 368 may perform substantial features of block 332, and the Presentation Layer 366 may perform substantial features of blocks 326 and 328. Further, the Presentation Layer 366, while illustrated as communicating with the Logical Layer 368 may also communicate directly or indirectly with Data Layer 370.

Figure 4:
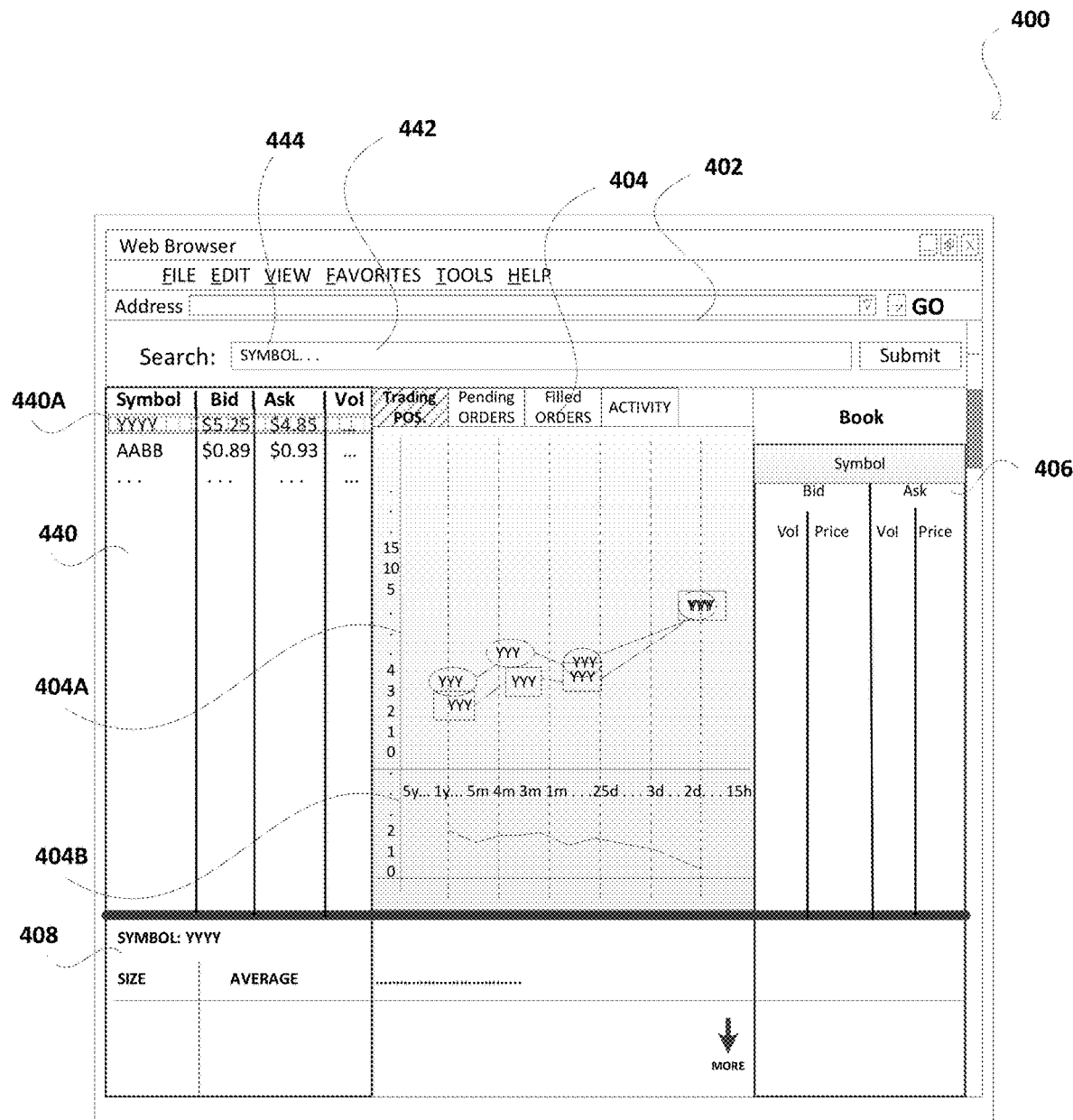
FIG. 4 illustrates an example of a window of an interface that may be dynamic and that can be presented in accordance with various embodiments.

FIG. 4 illustrates an example 400 of a window 402 of an interface that may be dynamic and that can be presented in accordance with various embodiments. In the example 400, the window 402 represents a user interface with an area of dynamic information. Particularly, area or section 404 includes a multi-dimensional event space, where information 404A, 404B is displayed in selectable links underlying bubbles or any other markers. The information 404A, 404B is dynamic and responsive to a selection 440A of a corresponding symbol for a security from the available symbols in area 440. As in the case of FIG. 1, the symbols YYYY, AABB, etc. are provided in columns 440 with bid, ask, and volume values. The window 402 is dynamic and can change as to area 404 independent of areas 406, 408, and 440. As such, executing a trade may be by a selection of a bubble or other marker displayed in area 404. This promotes accuracy in high frequency trading as the position of the markers change in the multi-dimensional event space according to the value of the security and with respect to time. This is provided in at least the X and Y dimensions of the event space.

With the values in the columns or area 440 reflecting the values for various symbols, the book values of area 406 separately provide separate tickers for historical values for a selection 440A of the symbol. For example, a user of the window 402 may select certain symbols for display via an entry 444 in field 442. In an example, multiple entries may be provided separated by a separator symbol such as a comma or a semi-colon, etc. When provided in the field 442, the symbols and associated bid and ask values are fetched and may be provided in section 440. Selection 440A of a symbol in section 440 results in information 404A, for that symbol, displayed in section 404 as markers and with line trails from prior values. Further, the multi-dimensional event space displaying the markers may be zoomed-in or zoomed-out reflecting further granularity of the data. As the executable code for the information 404A is available in the buffer for compile time, the granularity change generates instantaneous response with new values according to the selected time provided by the zoom. For example, the X axis presently lists years, to months, to days, to hours, to minutes, and even seconds, of time scale for which option values and risk values are instantaneously generated. The graphical UI 402, therefore, provides different levels of details for stocks and options, up to individual trade and quotes.

Section 408 supports display of pre and post-trade analysis. The risk assessment in section 404B is based in part on the bid-ask differences reflected in section 404A. Booking of a trade or executing an order may be by selection of the marker in section 404A, shown as oval or rectangular icons in the multi-dimensional event space. In addition, like in FIG. 1, tabs are provided for the trading positions, pending order, filled orders, and general activity in section 404. In addition to the above, section 408 may also support tabs for additional information, such as for Portfolio Accounting, Portfolio Management, Portfolio Reporting, and Regulatory Reporting. These reporting requirements may rely on financial frameworks such as Modern Portfolio Theory (MPT), Capital Asset Pricing Model (CAPM), Asset Pricing Theory (APT), Mult-factor stochastic differential equations (SDE). Further, the risk assessment in section 404B may be instantaneously determined using one of many available principal computational accelerator methodologies, such as Curve Bootstrapping and Monte Carlo Frameworks.

In an aspect, given a structure of a portfolio and a computing framework for at least risk assessment, an appropriate algorithm is loaded to a first buffer. The user may select, for instance, a willingness to take risk. The willingness may correspond to different levels of risk as measured by different available algorithms or by a single algorithm with varying parameters as stored in a parameter file. In an example, for a level of risk, a value is associated with a parameter indicating how an algorithm considers input values presented to it while determining an appropriate risk output. As such, the risk values in section 404B for current bid-ask values in section 404A may be customized to the willingness of a user, while maintaining the speed and granularity at which risk is displayed as the bid-ask values and volumes change. The algorithms can, therefore, be used to decide on the adequate method for the computation of the value at risk. The analytical engine 336 provides the computational core software features of the present implementation. A vertically integrated application stack is provided via system management 330, with modules for an allocation engine, a valuation & pricing Engine, an optimization engine, a risk engine, a forecasting analyzer, and a reliability analyzer. Interface 318 provides interfacing and networking components between the client devices, the market servers, and the trade server.

In an aspect, provided with a multi-asset class portfolio composed of a million assets, the present method and system is able to provide security values and is able to compute the value at risk to the portfolio by full valuation with accuracy in a limited time-frame, for e.g., under an hour. This is important to provide reference to how fast valuation of a portfolio and supporting risk is processed. In an example, the use of multiple buffers containing preloaded executables and parameters files, as well as the buffer controller that schedules tasks of at least loading from the buffers results in exceedingly reduced use of computing time and improves the computer performance. This is particularly the case for high resolution granularity in value at risk computation as explained elsewhere in this disclosure.

In an example, the buffer architecture includes the at least three buffers or buffer areas, which may be of three types. For example, one buffer or buffer area includes or is loaded with executable code that processes single factor SDE. This buffer may also support fine difference and random number generators for use with the single factor SDE. A second buffer or buffer area includes or is loaded with executable code to process hard to price security like Bermudian options, options with early exercise features etc. These are specific algorithms as referenced elsewhere in this disclosure and may not be executed unless scheduled requirement is provided for a portfolio containing such securities. A third buffer or buffer area includes or is loaded with executable code to process multi factors SDE with distribution of risk factors. In an example, the present system and method optimizes access type on the precomputed data available on the buffer by simultaneously reading the instruments or securities with fully repriced values from buffer in an "inner Monte Carlo" simulation. The "inner Monte Carlo" simulation may be an algorithm loaded to one of the buffers for providing calculation of security values and associated risk assessments. Such a process improves a bottleneck problem of Monte Carlo inner loop to fully reevaluate and reprice a portfolio while computing the risk.

Figure 5A:
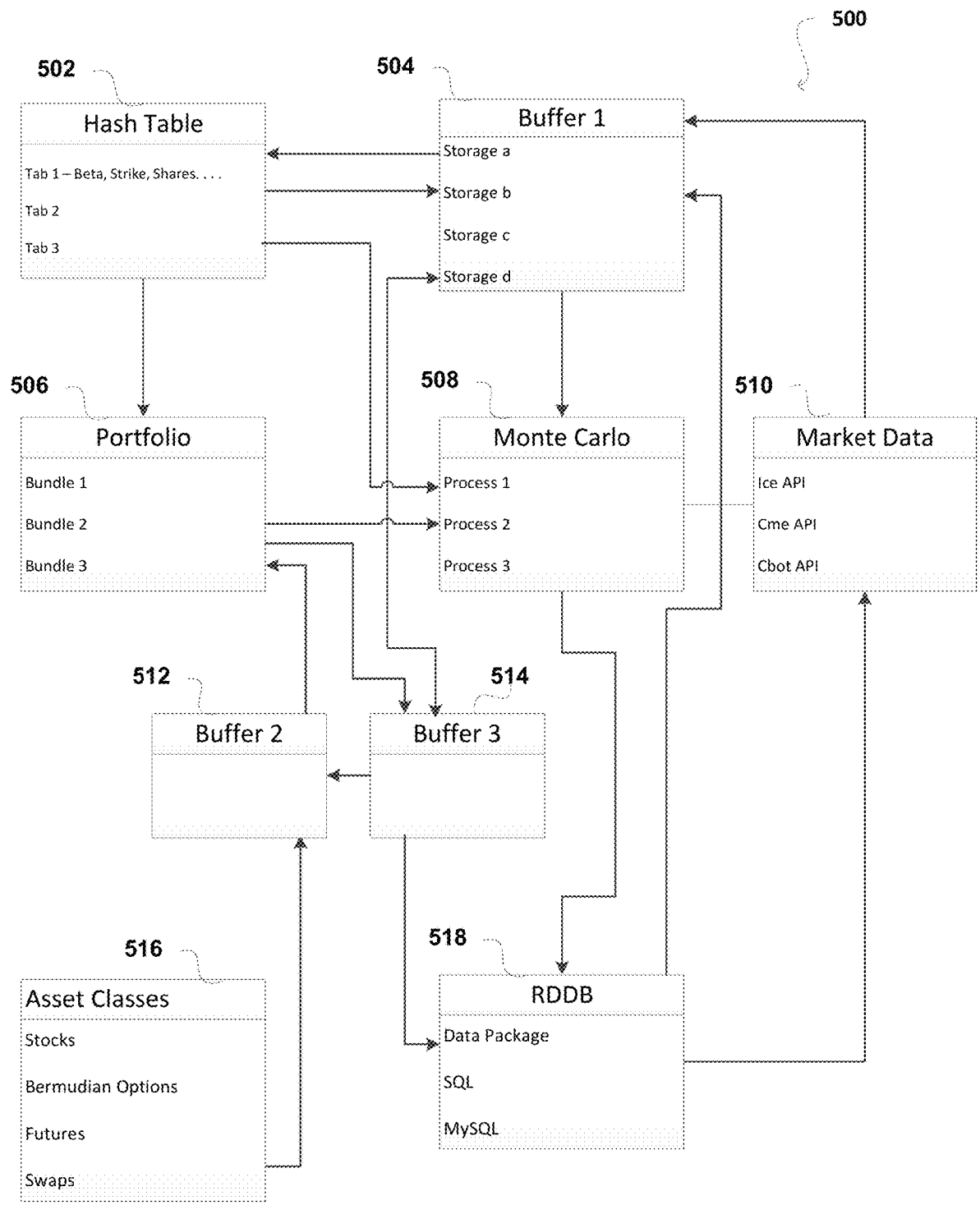
FIG. 5A illustrates an example database structure to provide dynamic processing and results including risk and security values, in accordance with various embodiments.

FIG. 5A illustrates an example database structure 500 to provide dynamic processing and results including risk and security values, in accordance with various embodiments. A database may include one or more tables or blocks of data 502-518. The tables or blocks may be related to each other in different ways to access, directly or indirectly, portions of the data from each other. The Buffers 504, 512, and 514 perform tasks associated with loading of values from data of securities from market data 516, from RDDB (resource domain data block) 518, from hash table 502, and from buffer 514 (e.g., for comparative analysis of output with the input); with loading to buffer 2 512 of the executable code from the asset classes 516; with loading of scheduling and mapping requirements for the processors associated with the processing from buffer 3 512 using directions indicated by the processes of the Monte Carlo (or other simulations) 508.

In at least one aspect, the three buffers include preloaded executables and parameters files for different algorithms capable of control and regulation of a distribution of random numbers that efficiently allocates the numbers and commodities to pricing model parameters. In doing so, a system including the three buffers is able to price a security at faster speeds than without the buffers holding the preloaded executables and parameters files. At least one of the different algorithms is a random numbers generator and allocator, and a second one of the different algorithms is a controller algorithm for a flow market price. In an aspect, prior to pricing the security, market data inputs are provided at an initial time (t0) and, subsequently, in real time. Such market data inputs may include interest rates, stock values, bond values, option values, swap values, and dividend values for one or more securities. At t0, these values may be provided to the algorithms of the buffers to calculate a portfolio value $P_t \in \{P_{t_0}, P_{t_1}, \ldots, P_{t_{m-1}}, P_{t_m}\} \in R^m$, which may be updated in real time. The parameters files may include values for parameters associated with the security, including K (strike price), Sigma (volatility), T (time to maturity), mu (expected return rate), Delta_T (change in value at time T), and N (number of time periods).

The parameters may be available to any of the algorithms in the buffers to enable fast valuation of the security and associated risks, for instance. In an example, the buffers may include preloaded executables for Asian Options, for stock pricing, for Bermuda Options, and other pricing algorithms. In at least one aspect additional parameters are made available for the algorithms; such as, the Asian Options pricing uses stock geometric and/or arithmetic means in its pricing; the stocks pricing uses correlation or K values for its pricing; the Bermuda Options uses St (option expiry asset price), K, and D (reference value, for instance); and the pricing algorithm uses present value (PV) of cash flows (C) over time t, Z (the spread at zero-volatility), or the spread z over the time t. The buffers 504, 512, and 514 can each include one of the preloaded executables for the Asian Options, for the Bermuda Options, for the stock pricing, and for the other pricing algorithms. Separately, a random number generator allocator may be executed via one of the buffers 504, 512, and 514 to provide random values for pricing in each of the preloaded executables. For instance, a low discrepancy generator, a Sobol generator, an MPI (Message Passing Interface)-based generator, or an RNG_allocator (randomizer) may be used to price the securities in a simulation phase (or to provide initial values). In an aspect, for the Asian Options, a Sobol generator may be used to provide an initial estimate with the corresponding preloaded executable using one or more number of simulations. In a further aspect, an equation such as follows may be used to determine or generate a first portfolio value, at time t(0) by calling the corresponding preloaded executable from a buffer and by accessing the corresponding parameters from the parameters file(s); and by repeating the preloaded executable until time t(m): $P(t_0, S_1(t_0), S_2(t_0), \ldots, S_n(t_0)) = \sum_{i=1}^{m} \alpha_i \times S_i(t_0, K, \mu, r, T) = P_0$. Subsequently, the Monte Carlo risk may be determined for the determined portfolio value at time t(0) to t(m).

Figure 5B:
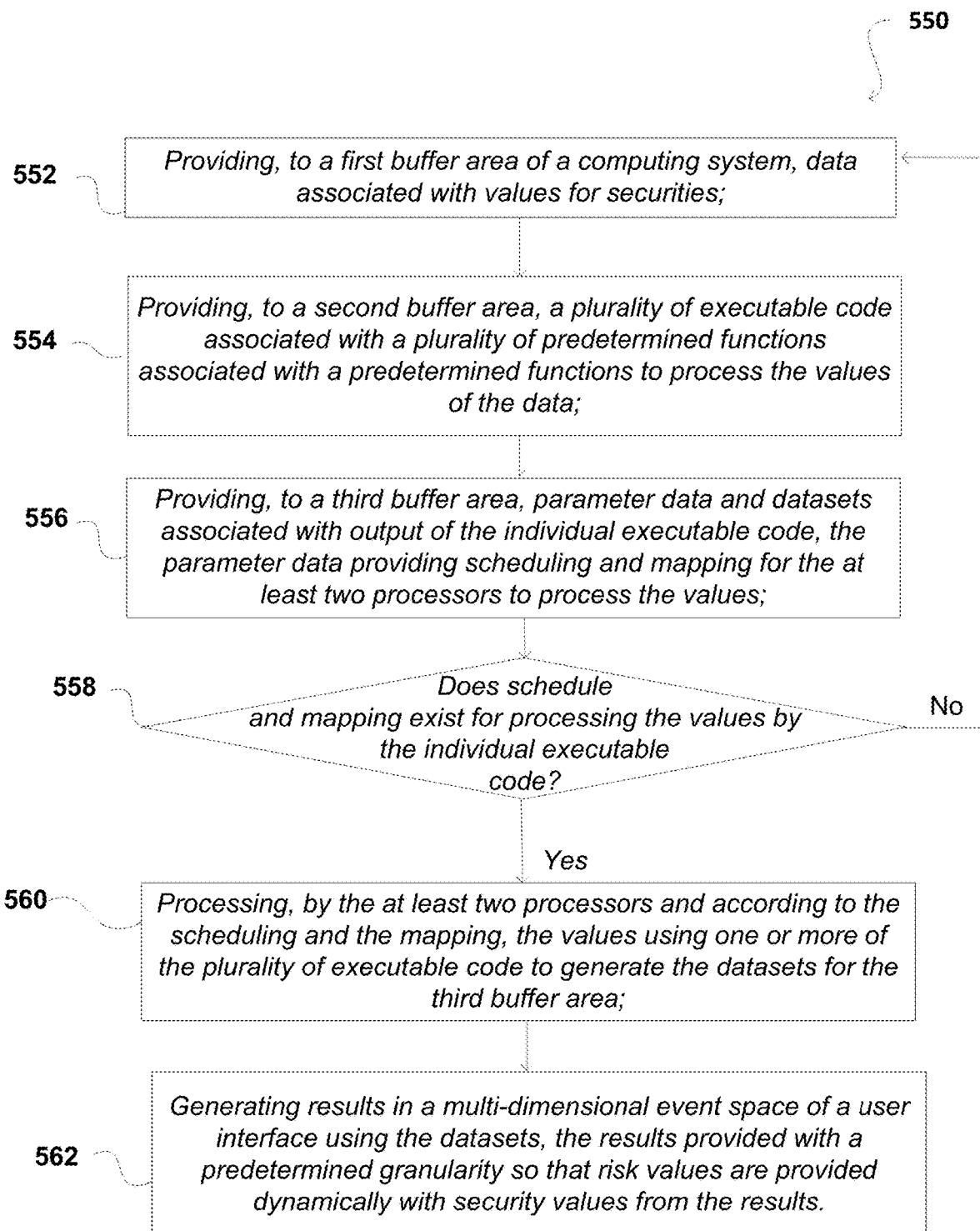
FIG. 5B illustrates a further example process flow to provide dynamic results including risk and security values, in accordance with various embodiments.

FIG. 5B illustrates an example process flow 550 to provide dynamic results including risk and security values, in accordance with various embodiments. Sub-process 552 provides, to a first buffer area of a computing system, data associated with values for securities. As previously noted in the examples of FIGS. 3A and 3B and subsequently in this disclosure, the data may include pre-processed data from a database or received in real-time from third party or other market servers that trade and track securities. Sub-process 554 provides, to a second buffer area of the computing system, executable code associated with predetermined functions. In an example, the predetermined functions are associated or dedicated to specific securities and may encompass different methods of predicting values for the securities and associated risk changes. Further, the executable code may be complied from script defining phases of equations or calculations associated with the required predictions and risk calculations. The executable code is associated with the predetermined functions to process values of the data as discussed in references to FIGS. 3A and 3B and subsequently in this disclosure. Sub-process 556 provides, to a third buffer area of the computing system, parameter data and datasets associated with output of the individual executable code. Particularly, the outputs from the calculations may generate datasets of predicted values and associated risk with different time points. Separately, the parameter data provides scheduling and mapping for the at least two processors in the computing system to process the values. As discussed throughout this disclosure, the system and method herein processes phases of the complex prediction equations associated with multiple securities in a continuous manner to keep the system current with current values. As such, the parallel processes rely on the buffers to receive the compiled executable code and to provide them for execution with mapped processors so as to generate the outputs for different phases of equations and to combine them.

Sub-process 558 verifies that schedule and mapping exist for processing the values by the at least two processors that a system for the process 550 may have. When such determination fails, then the buffer is committed to load appropriate values and to start the process fresh via the routing from sub-process 558. When such a determination in sub-process 558 is positive—that a mapping and schedule exists, then the values are processed via sub-process 560 using one or more of the executable code from the buffers to generate the datasets for the third buffer area. Sub-process 562 generates results in a multi-dimensional event space of a user interface using the datasets. The results are provided with a predetermined granularity so that risk values are provided dynamically with security values from the results. The predetermined granularity is partly based on the time units used in the scheduling and mapping and to which the outputs may correspond. For example, the predicted values and associated risk may be provided for hours, days, months, years, etc., depending on the periods from which corresponding historical values were used.

In a further aspect, the user interface is generated to comprise a first area for the results to comprise a second area. This is illustrated in at least FIG. 4. The method 550 supports dynamically modifying the interface to comprise, in the second area, a graphical view of the risk values provided dynamically with the security values. The graphical view corresponds to a display in the multi-dimensional event space previously described. The method 500 also, in an instance, enables providing, in the first executable code, at least one single factor stochastic differential equation (SDE) and random number generators. Furthermore, the second executable code provides at least one options pricing equation, while the third executable code includes at least one multiple factor SDEs for use with corresponding parameter files that provides input, for example. The results are enabled to include selectable areas in the multi-dimensional event space. As described elsewhere in this disclosure, the selectable areas are markers with hyperlinks for calling an underlying function to execute an order, for instance. This process improves accuracy of order placement where the value of a security is provided at different locations in the graphical view that is dynamically associated with a time at which the value is obtained. The selection of one of the selectable areas corresponds to one of the security values from the results as they dynamically appear. Subsequent to the selection, the method 500 enables triggering an order to execute at a displayed value in the one of the selectable areas. As such, the selectable areas correspond to at least two scales or axis in the multi-dimensional event space.

In a further aspect, the buffer controller selects to load one of: the first executable code, the second executable code, and the third executable code for processing in the processor in a cyclic schedule. In this manner, the buffers are not overloaded and the processing may also flush the buffers after each instance of computation for the display is complete. Further, the method 500 enables providing, from a second computing device, the first executable code, the second executable code, and the third executable code. The server then modifies, in accordance with a second schedule, any executable code loaded to buffer areas of the computing device. This modification may be to provide pertinent risk based algorithms for the buffer to use, or to provide specific precomputed values for the algorithms to use in its computation. Further, the precomputation may be performed at a second computer, such that a portion of data based on a predetermined period associated the risk values and the security values are precomputed. The portion of the data is provided in at least one of the first parameter files, the second parameter files, and the third parameter files. The portion of the data is then a basis for further computing to generate the results with a predetermined granularity.

An example of a solution for projected values and associated risk, Monte Carlo simulation may be used with general Brownian Motion (GBM) to project values from past values after incorporation of associated risk values from the past values. An equation for such a solution may be obtained from equation (1):

$$S[t_j][i] = S[t_{j-1}][i] \times \exp[(\mu_i - \tfrac{1}{2}\sigma_i^2)t_j + \sigma_i \text{Normal}(\,)\sqrt{t_j}] \text{ for } j=1,\ldots,m \qquad \text{Equation (1)}.$$

After repeating the above equation from j=1 to m, and providing the past values from a security at time times tj to m, the output of equation (1) provides a path for the security price projected to the future values. A person of ordinary skill would recognize the information required in Equation (1) and the subsequent equations in this disclosure upon reading the present disclosure. However, the present disclosure refocuses equation (1) and the subsequent equations to incorporate portions of the equation(s) and associated values in different buffers for concurrent evaluation of the equation using the values or to generate the values. For example, values associated with inputs to equation (1) may be stored in a first buffer (or buffer area)—as in the example systems of FIGS. 3A, B. The values may be provided to (e.g., loaded) to buffer 1 depending on the security for which projections are provided. In an example, equation (1) is phased to separately determine constituent values and to reduce system latency and improve dynamic nature using the buffers. For example, the inputs to equation (1) are provided from a first buffer area of a computing system, data associated with values for securities For example, instead of equation (1), four instructions are provided for the components of equation (1). Instruction 1 may generate μ, instruction 2 may generate σ, instruction 3 may generate Normal(0, 1), and instruction 4 may generate interest rate using, for example, the Heath-Jarrow-Morton Model.

The instructions are accessed from a buffer in a scheduled manner and mapped to appropriate available processors for processing. For example, the equations are loaded to a second buffer area of the computing system. The equations are provided as sets of executable code associated with the predetermined functions provided below as Equations (2). Each executable code may be associated with a predetermined function to process the input values of the data in the first buffer (or buffer area). As such, the executable code may be loaded, stored, or provided in a second buffer (or buffer area) depending on the security and the intended function to be performed. As the number of past values is large, the present use of the buffers to enable substantial parallel processing of the past values for generation of the projected values. In effect, the projection is generated in cyclic manner and using the instructions as executable code from the buffer. Then each of the below values, generally marked as equations (2), are generated to contribute to equation (1):

$$S[t_1][i] = S[t_0][i] \times \exp\left[\left(\mu_1 - \frac{1}{2}\sigma_i^2\right)t_0 + \sigma_i \text{Normal}(\ )\sqrt{t_0}\right]$$

$$S[t_2][i] = S[t_1][i] \times \exp\left[\left(\mu_i - \frac{1}{2}\sigma_i^2\right)t_1 + \sigma_i \text{Normal}(\ )\sqrt{t_1}\right]$$

$$\vdots$$

$$S[t_m][i] = S[t_{m-1}][i] \times \exp\left[\left(\mu_i - \frac{1}{2}\sigma_i^2\right)t_m + \sigma_i \text{Normal}(\ )\sqrt{t_m}\right].$$

Equations (2)

Then, the values from $(S[t_0][i], s[t_1][i], \ldots, S[t_m][i])$ together represent the single path for the instrument Si. In an example, the path is provided as datasets of risk value taken with projected value from each of the component equations (2).

The datasets may be stored, loaded, or provided in a third buffer (or buffer area). In addition, the third buffer (or buffer area) of the computing system may also include (either loaded or provided with) parameter data for scheduling and mapping of at least two processors in the computing system to process the values in the first buffer via Equations (2). In an example, the scheduling and mapping is associated with the availability of the at least two processors at the time of execution of the executable code association with Equations (2). The datasets may be used to generate results in a multi-dimensional event space of a user interface, such as illustrated in the examples of FIG. 4. The results are provided with a predetermined granularity—e.g., depending on the time values associated with the inputs to equations (2), so that risk values are provided dynamically with security values from the results.

In yet another aspect, n-dimensional solutions may be processed using the present system and method. For example, time step features for a portfolio may be activated to provide multiple different time samples to evaluation from past values to projected values. Time step features may be used to schedule times at which the portfolio will be evaluated. In an aspect, a set of times may be provided by $t \in \{t_0, t_1, \ldots, t_{m-1}, t_m\}$. This defines the time change in market-to-market value (e.g., $\Delta t_j = t_j - t_{j-1}$). Projected values of each asset in the portfolio is generated, given by $P_t \in \{P_{t_0}, P_{t_1}, \ldots, P_{t_{m-1}}, P_{t_m}\} \in R^m$. Thereafter, a portfolio of securities (each security projected using Equations (2), for instance) is defined by:

$$P(t, S_1(t), S_2(t), \ldots, S_n(t)) = \Sigma_{i=1}^{m} S_i(t, K, \mu, r, T) \quad \text{Equation (3)}.$$

Ss in Equation (3) represents the tradable instruments at the time t. In addition to the above, a multi-asset portfolio mean, at time values obtained from a database system and from the first buffer may be applied in the above calculations.

In another aspect, for a predetermined function $F(S_{t_j})$, representing a pricing model or valuation function associated to an asset or security, the present system and method determines values projected for the asset or security in parallel for future times based at least in part on past values. The computation of these values is done in parallel using at least the logical layer 368, and in particular, the portfolio analysis module 368B (also recognized as an analytics engine 332 in the implementation of FIG. 3A). As in the case of the above calculations, the values for the asset or security is loaded to the first buffer, with the associated models and valuations in the second buffer, the scheduling for parallel calculations in the third buffer, and the dataset outputs in the third buffer. The portfolio return for the asset or security is provided in Equation (4):

$$r_j[P_{t_j}(S_{1,t_j}, \ldots, S_{n,t_j})] = \frac{P_{t_j}(S_{1,t_j}, \ldots, S_{n,t_j}) - P_{t_{j-1}}(S_{1,t_{j-1}}, \ldots, S_{n,t_{j-1}})}{P_{t_{j-1}}(S_{1,t_{j-1}}, \ldots, S_{n,t_{j-1}})} \quad j = 1, \ldots, n.$$

Equation (4)

Further, a portfolio, m, that includes n-by-n covariance matrices may be generated in parallel for each future time using the present method and system. The second buffer, for example, may be configured to host a correlated (and generated) random Normal, from which positively defined symmetric matrices are determined at each time step. In an aspect, for n assets having n correlated paths simulated by projected values, correlated random numbers are generated in time steps using $\omega_1, \omega_2, \ldots, \omega_n$. Further, parallel determination is enabled by taking aspects of the required calculations and providing them in phases (as in Equations (5)), all loaded to the second buffer as executed code:

$$\omega_j = \Sigma_{k=1}^{n} \alpha_{jk} \times \text{Normal}(0,1)_k$$

$$\text{Mean}(\omega_i) = 0,$$

$$\text{Covariance}(\omega_i, \omega_j) = \text{Covariance}(r_i, r_j) = \Sigma_{k=1}^{n} \alpha_{ik} \alpha_{kj}$$

$$\omega = \alpha \times \text{Normal}(\ ) \text{Solve for } \alpha \text{ using Cholesky} \quad \text{Equations (5)}.$$

Equations (5) provide a decomposition or factorization using the Cholesky process to solve an aspect of the Monte Carlo analysis—i.e., to find correlations in the values provided as inputs to $\omega_j$. $\omega_j$ represents the correlated random numbers used for the correlated paths, and Normal (0, 1) may be sampled from a random distribution, while the alpha value represents a coefficient associated with the Cholesky process. A person of ordinary skill would recognize the context and use of the above equations upon reading the present disclosure that incorporates portions of these equations and generated values in buffers to concurrently process the equations. The Cholesky process, as applied to past values of the first buffer to find correlations from the past values for projecting future values, is readily apparent to one of ordinary skill reading the present disclosure.

Further, a similar implementation using the dedicated buffers may be processed for a bundle of assets. For example, assume an expression denoted by V—the aggregated (or bundled) elements being grouped by asset class types that will be stored as a precomputing factor. Separately, however, contributing phases of the equation may be subject to the parallel computation applied from executable code or instructions for the phases as loaded to the second buffer. The phases allow for data associated with input to the equation to be processed in a parallel manner by scheduled and mapped processors. For example, a bundle of assets may be subject to determination for correction by Equation (6).

$$V(K, \mu, t_j, m, ytm, couponrate, libor, IR) = \sum_{k=1}^{2} S_{t_j}(K, \mu_k, m_k, IR, \ldots,)$$

Equation (6)

Equation (6) is subject to repeated computation from time $t_{j-1}$, where j ranges from 1 to m. Here, such computation may steer resources from the system and processing in parallel is useful using the present system and method. In an example, for determining V of Equation (6), using the parallel computing system and method here, reliance is made on phases of values and executable code in the buffers. For example, executable code and values may be aggregated for instruments taken by type governed in part by Equation (7):

$$\beta_{t_j}(\gamma, V(S,T)) = \Sigma_{j=1}^{\gamma} V(K, \mu, t_{j-1}, S, \ldots)$$

Equation (7).

Further, the Portfolio value at time tm may be provided by an output of Equation (8), which may also be provided to the buffer as an executable code when it is determined that a portfolio value is required:

$$P_{t_m}(V(S,T)) = \Sigma_{\gamma=1}^{N} \beta_{t_{m-1}}(\gamma, V(S,T))$$

Equation (8).

The self-financing for the portfolio $P_{tm}$ may be obtained by $h_t \triangleq h(S_{t_m})$, where Vt is typically $h_t S_t$ and subsequent calculation of change in V at time t may be obtained from calculating the changes to $h_t S_t$ over time intervals. A subsequent payoff (underlying intrinsic value of the security) may be determined from a maximum function applied to $h_t S_t$ using the portfolio value, as given by: payoff=Max[0,h(P(S_t))].

The present method and system enable currency forward and equity forward determinations that are related to calculation of risk and of expected shortfalls of currency forward using a historical method, analytical method, or two different types of Monte Carlo method—Geometric Brownian Motion (GBM) that simulates Spot Rate and Vasicek Model to simulate domestic/foreign interest risk. In an aspect, GBM is used primarily to simulate Spot Rate, while the historical method simulates domestic/foreign interest risk. In an implementation, using the system of FIG. 3B, data and executable code input is provided from the data layer 370—either received from the market servers 356, 360, at a predetermined time or continuously—via the data base 370B. Using such scripted language as C, C #, or C++, executable code for using the data input for the buffers is provided via files (e.g., main.cpp for data input and data.csv or Data_1y.csv for the data). The data is loaded to buf1 370C and the executable code to Buf2 368C of logical layer 368. In an instance, the data may be pre-processed to a format acceptable by the executable code. For example, when the data is obtained from Excel® sheets, the data may be formatted to include historical domestic interest rate, foreign interest rate, spot rate/exchange rate.

In an aspect, from the above data and executable code, domestic/foreign zero coupon bond price may be determined as pre-processed part of the data. Such pre-processing may occur using the appropriate executable code functioning across the buffer of the logical layer and the buffer of the data layer. With S as the spotRate, a determination is made for PVd for the coupon bond price, given by 1/(1+DomRate*T). PVf is separately determined as 1/(1+ForRate*T), where T is time to maturity in days—i.e., 90/360, but other time periods are acceptable as input. A daily return of the assets associated with these values are determined and stored as part of the datasets output in buffer 3. For the analytical method, weights may be first determined via the pre-processing step. In an example, a calculated weight may be weight1=S*PVf and weight2=K*PVd, where K is strike price. The weights may be determined only as of the immediate last working day—but other options including timing and length of steadiness of the value at a specific rate may be considered to determine what rate to use.

In yet another aspect, stock options may be priced using the present system and method. For example, executable code may be designed to include calculations for risk and the expected shortfall of a vanilla option using the above referenced three methods. Distinct from currency and equity forward calculations, the stock options are determined via similar three methods but with representative changes that are particular to the type of security. For instance, the historical method for stock options use historical option price changed to simulated future option price. Then future profit and loses (P&L) are calculated. Calculations are further made for a value at risk (VaR) and expected shortfall (ES). In the analytical method for stock options, two sub-methods are applicable—including a first method that relies on an assumed return of option follow normal distribution, where VaR is taken as $\mu-\alpha*\sigma$. A second sub-method that may be used based at least in part on historical Greeks (risk values) from stock price change and volatility change to calculate future P&L. VaR and ES are also determined for this method. Change in portfolio values may be determined using dP=delta*dS+0.5*gamma*dS^2+vega*dsigma. A third method available for stock options is based in part on a Monte Carlo method using GBM to simulate stock price and to then perform calculations similar with prior descriptions of the GBM process in this disclosure. All these methods may rely on loaded executable code in a buffer area, which process data from a buffer of the data layer. As such, determinations using these methods simulate stock but may not determine volatility.

In an aspect, executable code for the stock options may be similarly implemented as previously noted, with C, C #, C++ coding used to generate executable code. In an example, the script from such coding languages (and particular to the type of security) may be compiled at build time to generate executable code that is loaded to the relevant processing buffer. Further the code maybe appropriated named and the data sets associated with the security are used to generate the final values. In another example, interest swap rates are also a security processed in the present method and system using similar processing features as described with the other example securities above.

Figure 6:
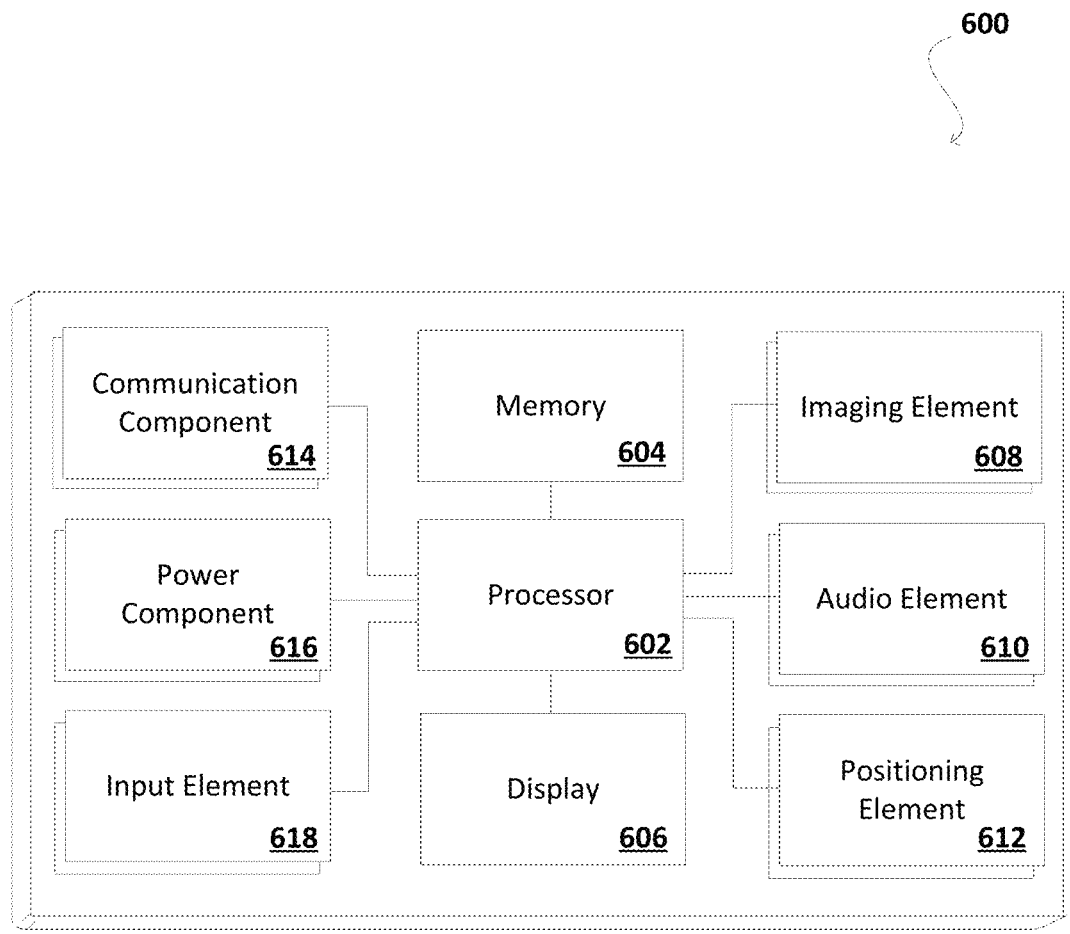
FIG. 6 illustrates example components of a computing device that can be utilized in accordance with various embodiments.

FIG. 6 illustrates example components of a computing device 600 that can be utilized in accordance with various embodiments. In this example, the device includes a processor 602 for executing instructions that can be stored in a memory device or element 604. As would be apparent to one of ordinary skill in the art, the device 600 can include many types of memory, data storage, or non-transitory computer-readable storage media, such as a first data storage for program instructions for execution by the processor 602, a separate storage for images or data, a removable memory for sharing information with other devices, etc. In addition, the memory 604 may include the buffer 604A or buffer areas 604B. For purposes of illustration, the buffer 604 is provided in a single block, but a person of ordinary skill would recognized, based in part on the disclosure herein, that the buffer may be comprised of many physically separate or integrated memory components. Such components may include RAM or NOR memory components for example. The processor is also illustrated as a single block 602, but a person of ordinary skill reading the present disclosure would understand that the processor 602 may include a buffer controller as a physically separate or an integrated feature.

The device may include a position element 612 to provide positioning for updated results based on geographic position of the device 600. The device 600 will include some type of display element 606, such as a touch screen or liquid crystal display (LCD), although devices such as portable media players might convey information via other means, such as through audio speakers. As discussed, the device in many embodiments will include at least one input element 618 that is able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands using imaging element 608 and audio element 610, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet using communication component 914, and may be able to communicate with other such devices using this same or a similar component. Components 602-614 and 618 may be powered by power component 616 using internal or, in combination with, an external power supply.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component 614.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a request for one or more symbols of one or more securities. In this case, the data store may respond with the information about current values or precomputed data portions. The current values or precomputed data portions may also come from an index database for faster access, and may include a timestamp indicating current date and time for the data. The information then can be returned to the buffer areas and may be deployed by respective executable code that processes the data first to provide a risk assessment with the data.

Each server will include an operating system that provides executable program instructions for the general administration and operation of that server, and will include a non-transitory computer-readable medium storing instructions that, when executed by a processor of the server, allow the server to perform its intended functions. Suitable implementations for the operating system and functionality of the servers are known or commercially available, and are readily implemented by persons having ordinary skill in the art, particularly in light of the disclosure herein.

The environment in one embodiment is a distributed computing environment utilizing several computing systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python®, or Tool Command Language (TCL), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
providing, to a first buffer area of a computing system, data associated with values for securities;
providing, to a second buffer area of the computing system, a plurality of executable code associated with a plurality of predetermined functions, individual executable code of the plurality of executable code associated with a predetermined function of the plurality of predetermined functions to process the values of the data;
providing, to a third buffer area of the computing system, parameter data and datasets associated with output of the individual executable code, the parameter data providing scheduling and mapping for the at least two processors in the computing system to process the values;
processing, by the at least two processors and according to the scheduling and the mapping, the values using one or more of the plurality of executable code to generate the datasets for the third buffer area; and generating results in a multi-dimensional event space of a user interface using the datasets, the results provided with a predetermined granularity so that risk values are provided dynamically with security values from the results.

2. The computer-implemented method of claim 1, further comprising:
generating the user interface to comprise a first area for the results and to comprise a second area; and
dynamically modifying the interface to comprise, in the second area, a graphical view of the risk values provided dynamically mapped to second values of the datasets.

3. The computer-implemented method of claim 1, wherein the plurality of predetermined functions comprises at least two of: a single factor stochastic differential equation (SDE), an Explicit Euler function, a Milstein function, a semi-implicit Euler function, an Implicit Milstein function, a weak predictor-corrector function, a transform semi-implicit Euler function, and a transform explicit Euler function.

4. The computer-implemented method of claim 1, wherein the scheduling allocates priority to one or more of the plurality of executable code for the processing of the values of the data.

5. The computer-implemented method of claim 1, further comprising:
providing, in the third executable code, at least one multiple factor SDEs.

6. The computer-implemented method of claim 1, further comprising:
enabling the results to include selectable areas in the multi-dimensional event space, such that selection of one of the selectable areas corresponds to one of the processed values from the results as they dynamically appear; and
triggering an order to execute, at the trigger time or at a later time, using a displayed value in the one of the selectable areas.

7. The computer-implemented method of claim 6, wherein the selectable areas correspond to at least two scales in the multi-dimensional event space.

8. The computer-implemented method of claim 1, wherein the first buffer area functions as a translation lookaside buffer (TLB) and comprises different random number generators, portfolio correlation matrix, and calibration data for the predetermined functions of the second buffer area.

9. The computer-implemented method of claim 1, wherein the values for securities include asset values for assets held for an account, market data for variation of the asset values, and wherein the first buffer area is overwritten within a predetermined period of time to ensure that the asset values and the market data are current.

10. The computer-implemented method of claim 1, wherein contents of the first buffer area, the second buffer area, and the third buffer area are accessible via an application programming interface (API).

11. A system comprising:
a first buffer area;
a second buffer area;
a third buffer area;
a buffer controller;
at least two processors; and
memory comprising instructions that when executed by the at least two processors cause the system to:
provide, to a first buffer area of a computing system, data associated with values for securities;
provide, to a second buffer area of the computing system, a plurality of executable code associated with a plurality of predetermined functions, individual executable code of the plurality of executable code associated with a predetermined function of the plurality of predetermined functions to process the values of the data;
provide, to a third buffer area of the computing system, parameter data and datasets associated with output of the individual executable code, the parameter data providing scheduling and mapping for the at least two processors in the computing system to process the values;
process, by the at least two processors and according to the scheduling and the mapping, the values using one or more of the plurality of executable code to generate the datasets for the third buffer area; and
generate results in a multi-dimensional event space of a user interface using the datasets, the results provided with a predetermined granularity so that risk values are provided dynamically with security values from the results.

12. The system of claim 11, wherein the instructions when executed by the at least two processors further cause the system to:
generate the user interface to comprise a first area for the results and to comprise a second area; and
dynamically modify the interface to comprise, in the second area, a graphical view of the risk values provided dynamically mapped to second values of the datasets.

13. The system of claim 11, wherein the plurality of predetermined functions comprises at least two of: a single factor stochastic differential equation (SDE), an Explicit Euler function, a Milstein function, a semi-implicit Euler function, an Implicit Milstein function, a weak predictor-corrector function, a transform semi-implicit Euler function, and a transform explicit Euler function.

14. The system of claim 11, wherein the instructions when executed by the at least two processors further cause the system to:
allocate priority, using the scheduling, to one or more of the plurality of executable code for the processing of the values of the data.

15. The system of claim 11, wherein the instructions when executed by the at least two processors further cause the system to:
provide a first option for selection of a predetermined function of the predetermined functions;
provide a second option for input of the data;
enable the selected predetermined function to process the data using the scheduling and the mapping for at least one of the at least two processors and using a first portion of the data as input parameters to the selected predetermined function to simulate future values for the values;
generating profit and loss basis from the simulated future values, the simulated future values and the profit and loss basis comprised in the dataset along with assumed variables used in the selected predetermined function.

16. The system of claim 11, wherein the instructions when executed by the at least two processors further cause the system to:
enable the results to include selectable areas in the multi-dimensional event space, such that selection of one of the selectable areas corresponds to one of the security values from the results as they dynamically appear; and trigger an order to execute at a displayed value in the one of the selectable areas.

17. The system of claim 16, wherein the selectable areas correspond to at least two scales in the multi-dimensional event space.

18. The system of claim 11, wherein the buffer controller uses the scheduling and the mapping to select loading of one of the plurality of executable code from the second buffer area based at least in part on a type of the values of the data for the processing of the values of the data.

19. The system of claim 11, wherein the instructions when executed by the at least two processors further cause the system to:
provide an application programming interface (API) to allow access to the contents within the first buffer area, the second buffer area, and the third buffer area.

20. The system of claim 11, wherein the first buffer area functions as a translation lookaside buffer (TLB) and comprises different random number generators, portfolio correlation matrix, and calibration data for the predetermined functions of the second buffer area.

\* \* \* \* \*